(12) United States Patent
Cammack et al.

(10) Patent No.: US 7,237,121 B2
(45) Date of Patent: Jun. 26, 2007

(54) SECURE BOOTLOADER FOR SECURING DIGITAL DEVICES

(75) Inventors: William E. Cammack, Dallas, TX (US); Jason Douglas Kridner, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 867 days.

(21) Appl. No.: 09/954,124

(22) Filed: Sep. 17, 2001

(65) Prior Publication Data

US 2003/0056107 A1    Mar. 20, 2003

(51) Int. Cl.
G06F 12/14 (2006.01)
G06F 21/00 (2006.01)

(52) U.S. Cl. ............... 713/189; 713/167; 713/168; 380/255

(58) Field of Classification Search ............ 380/4, 380/232; 713/185, 201, 2; 711/101; 705/57
See application file for complete search history.

(56) References Cited

U.S. PATENT DOCUMENTS

| 5,379,342 | A |   | 1/1995  | Arnold et al.            |
|-----------|---|---|---------|--------------------------|
| 5,390,331 | A | * | 2/1995  | Yui ............... 711/115 |
| 5,421,006 | A |   | 5/1995  | Jablon et al.            |
| 5,610,980 | A | * | 3/1997  | Johnson et al. ....... 713/189 |
| 5,629,980 | A |   | 5/1997  | Stefik et al.            |
| 5,666,411 | A | * | 9/1997  | McCarty ............ 705/51 |
| 5,692,047 | A |   | 11/1997 | McManis                  |
| 5,734,819 | A | * | 3/1998  | Lewis ............... 726/29 |
| 5,892,900 | A |   | 4/1999  | Ginter et al.            |
| 5,892,904 | A |   | 4/1999  | Atkinson et al.          |
| 5,920,861 | A |   | 7/1999  | Hall et al.              |
| 5,937,063 | A |   | 8/1999  | Davis                    |
| 5,940,513 | A | * | 8/1999  | Aucsmith et al. ....... 713/187 |
| 5,943,422 | A |   | 8/1999  | Van Wie et al.           |
| 5,995,624 | A | * | 11/1999 | Fielder et al. ........ 713/169 |
| 6,021,201 | A |   | 2/2000  | Davis et al.             |
| 6,094,702 | A | * | 7/2000  | Williams et al. ....... 711/101 |
| 6,157,721 | A |   | 12/2000 | Shear et al.             |
| 6,173,403 | B1| * | 1/2001  | DeMont ............. 713/185 |
| 6,185,678 | B1|   | 2/2001  | Arbaugh et al.           |

(Continued)

FOREIGN PATENT DOCUMENTS

EP    1 085 420 A    3/2001

(Continued)

OTHER PUBLICATIONS

Bruce Schneier, Applied Cryptography, 1996, John Wiley & Sons, Second Edition, pp. 180-181, 561-563.*

(Continued)

*Primary Examiner*—Nasser Moazzami
*Assistant Examiner*—Carl Colin
(74) *Attorney, Agent, or Firm*—Robert D. Marshall, Jr.; W. James Brady; Frederick J. Telecky, Jr.

(57) ABSTRACT

A secure bootloader for securing software and systems in a digital device 110 by ensuring only encrypted and authenticated boot software is loaded and executed in the digital device 110. The encrypted boot software is read into the device 110 and authenticated. If the boot software is not authenticated, then the digital device 110 does not boot.

5 Claims, 3 Drawing Sheets

U.S. PATENT DOCUMENTS

| | | | |
|---|---|---|---|
| 6,240,185 B1 | 5/2001 | Van Wie et al. | |
| 6,411,941 B1 * | 6/2002 | Mullor et al. | 705/59 |
| 6,643,781 B1 * | 11/2003 | Merriam | 726/35 |
| 6,678,833 B1 * | 1/2004 | Grawrock | 713/401 |
| 6,684,326 B1 * | 1/2004 | Cromer et al. | 713/2 |
| 6,711,553 B1 * | 3/2004 | Deng et al. | 705/57 |
| 6,745,138 B2 * | 6/2004 | Przydatek et al. | 702/61 |
| 6,986,057 B1 * | 1/2006 | Cusey et al. | 713/161 |
| 2001/0018736 A1 * | 8/2001 | Hashimoto et al. | 713/1 |
| 2002/0016917 A1 * | 2/2002 | Kitamura | 713/189 |
| 2002/0076051 A1 * | 6/2002 | Nii | 380/232 |

FOREIGN PATENT DOCUMENTS

| | | |
|---|---|---|
| GB | 2 356 469 A | 5/2001 |
| WO | WO 00 10283 A | 2/2000 |
| WO | WO 00 79368 A | 12/2000 |

OTHER PUBLICATIONS

*IEEE Std.*, 1149.1-1990, 'Online! May 21, 1990, IEEE, New York, XP002249194, ISBN: 1-55937-350-4, p. 10 and 12; retrieved from Internet: URL: http://standards.ieee.org..

Olin Sibert: *Inter Trust Embedded Technologies Secure Hardware Initiatives*; Nov. 2000; Intertrust Technologies Corp.

Internet Article (Jul. 18, 2001): *Trustchip™ Architecture: How the InterTrust TrustChip Architecture Works*, Intertrust Technologies Corp., 2 pgs.

Internet Article [Jul. 18, 2001 (www.intertrust.com)]: *TrustChip™ Architecture*, Intertrust Technologies Corp., 2 pgs.

Internet Article [Jul. 18, 2001 (www.intertrust.com)]: *Embedded Technologies: FAQs*, Intertrust Technologies Corp., 3 pgs.

Internet Article: *InterTrust Hardware FAQs*, Intertrust Technologies Corp., 5 pgs.

Internet Article [Jul. 18, 2001 (www.micronas.com)]: *Micronas*: Micronas Launches World's First Secure Microcontroller. Press Release, 2 pgs.

* cited by examiner

SECURE BOOTLOADER FOR SECURING DIGITAL DEVICES

This application claims priority to the provision application Ser. No. 60/303,743 entitled "Secure Bootloader for Securing Digital Devices", filed Jul. 6, 2001, which provisional application is incorporated herein by reference.

FIELD OF THE INVENTION

This invention relates generally to digital devices and specifically to providing security for digital devices and their contents during the power-up sequence of the digital devices.

BACKGROUND OF THE INVENTION

The Internet (the Information Superhighway) has provided the world with a way to rapidly and easily share vast amounts of information. Unfortunately, a large percentage of the information being disseminated is without the consent of the information's owner. There are numerous websites, Usenet newsgroups, and distributed-server networks located on the Internet whose express purpose is the illicit exchange of software programs and copyrighted materials such as music, movies, books, and art.

The illegal distribution of copyrighted music is particularly rampant, with some of the more popular distributed-server networks exchanging millions of compressed music files every day. In an attempt to reduce future lost revenue and preserving the rights of the copyright owners, a forum of more than 180 companies and organizations has created a set of guidelines known as the Secure Digital Music Initiative (SDMI).

SDMI specifies many guidelines concerning securing digital audio, but there are two primary security factors: security of content files and security of software and systems located inside a digital device. The securing of the content files is relatively simple and usually involves the use of some sort of encryption algorithm and an encryption/decryption key(s). Companies such as Liquid Audio and Intertrust have developed Digital Rights Management (DRM) software to protect content files stored on external media.

Providing security for the digital device playing the secured content file is more difficult because it involves protecting software executing on an inherently insecure programmable processor. Securing the digital device is difficult because the user has physical possession of the digital device while the manufacturer and the content provider do not. The user may attempt to hack the digital device through the software by using test equipment, logic analyzers, etc. or via physical means by replacing memory chips and other components in the digital device.

Since the user has physical possession of the digital device, the manufacturer cannot physically protect the hardware anymore than making it difficult for the user to physically modify circuitry inside the digital device. An extreme form of protection for the circuitry would be having circuitry that can detect tampering and would automatically self-destruct. Because the digital device costs money, the destruction of the digital device due to hacking when it was paid for with hard-earned money will deter most casual hackers.

In order to fully protect the software portion of the digital device, the manufacturer must provide security for all operational aspects of the digital device. From the very first operation that the digital device performs when it is first turned on to the last operation immediately before powering off, the software must be protected. Perhaps the most opportune time to hack into the software of a digital device is during its power-on sequence, also commonly referred to as the boot-up sequence. This is because during the power-on sequence, several different programs pass around the control of the digital device. If the hacker can cause the digital device to load up a program of his own design, he will gain complete control of the digital device.

Many inventions have attempted to provide power-on security for digital devices.

Some require the use of adjunct security processors or chips. While this solution may be viable for complex and expensive devices such as computers, but for high-volume, low-profit margin digital devices such as audio players, active picture frames, and other digital appliances, the use of adjunct security processors is simply not a viable solution. U.S. Pat. Nos. 5,421,006 and 5,379,342 present secured boot models using verification of the boot block of the operating system before control is transferred to the operating system.

U.S. Pat. No. 6,185,678 (the '678 patent) presents a secure model that includes securing both the verification program and the memory storing the operating system. This patent uses cryptographic certificates that expire with time and limits the validity of steps within the power-on sequence to small slots of time. The security model presented in the '678 patent is therefore, unnecessarily complex.

U.S. Pat. No. 5,937,063 presents a system to prevent unauthorized replacement of boot-up firmware embedded in modifiable memory such as flash memory and erasable-programmable read-only memory using the encryption and decryption of commands and instructions. This patent uses a secured boot device with its own built-in cryptographic unit.

Solutions that use executing programs in a protected memory space or a security coprocessor to provide security have a significant disadvantage in their requirement of a significant addition to the overall hardware requirements of the system. The increased hardware requirement results in a system with greater die area and hence greater costs. A need has therefore arisen for a method and apparatus for providing a simple and secured power-on sequence for digital devices and their protected contents.

SUMMARY OF THE INVENTION

In one aspect, the present invention provides a method for securing a digital device from its initial power-up sequence by verifying the authenticity of an encrypted program file containing the operating system or the user-interface program for the digital device. The method involves computing a first encryption/decryption key, reading a second encryption/decryption key that is associated with the program file, reading the encrypted object file, authenticating the encrypted object file, decrypting the encrypted object file, loading the decrypted object file, and executing the decrypted object file if the object file was authenticated.

In another aspect, the present invention provides a method for securely re-authoring an unbound program file to a bound program file. The method involves obtaining a first and a second key, reading the unbound object file, authenticating the unbound object file, decrypting the unbound object file, re-encrypting said decrypted object file, authenticating the re-encrypted object file, saving the re-encrypted object file if the unbound object file was authenticated.

The present invention has a principal advantage in that it can ensure the security of files containing protected content by preventing unauthorized programs from taking control of a digital device without requiring the presence of special security processors or complex security algorithms.

An additional advantage of the present invention is that it provides a sufficient level of flexibility that it permits the digital device to process content files that are either unprotected or protected and if the content files are protected, the present invention permits the digital device to process content files that are intended for only a single user or a group of users.

Yet another advantage of the present invention is a small overall net increase of die area. With very little hardware required to provide security, the present invention increases the hardware requirements by a negligible amount, therefore, having a minimal impact on the cost of the system.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Digital devices are vulnerable to attack from hackers wishing to obtain access to the devices' contents. The devices are especially vulnerable during the power-up (bootup) sequence. In many digital devices, if the power-up sequence can be interrupted or a program different from the intended program can be loaded into the digital device during the power-up sequence, then the digital device becomes open to manipulation by the hacker.

Many manufacturers also include additional test hardware to facilitate testing of the devices during the manufacturing process. The same test hardware becomes another avenue of attack that can be exploited to overcome built-in security measures. Additionally, since the digital devices often include a microprocessor or a digital signal processor (DSP), the digital device becomes vulnerable to attack through these processors due to scan test hardware added by the microprocessor or DSP manufacturer to facilitate functional validation of the microprocessor or DSP during manufacture.

While the example used in the discussion of the present invention is a digital device, which implies a relatively simple, self-contained device that is hand-held and has a single function, the application of the present invention is not limited to these simple devices. The discussion also centers on protected music files, but the present invention is applicable to any file with protected content. The present invention has application in any digital device, including computers that undergo a power-up sequence and requires security for the content located in its memory or information kiosks that are basically self-contained computers placed in public places to provide information to users.

Central to security issue is the digital device itself, in this case, one that is capable of taking as input an encoded content file (either encrypted or unencrypted) and provides the decoded content to the user of the digital device. The encoded content file may be stored in memory inside the digital device or it may be stored on a memory card inserted into the digital device. Since a user usually purchases the digital device through a retail location and owns the device, the content provider has no control over what the user does to the device, i.e., the user may use it for its intended purpose or he may hack it to obtain access to the content files.

Figure 1:
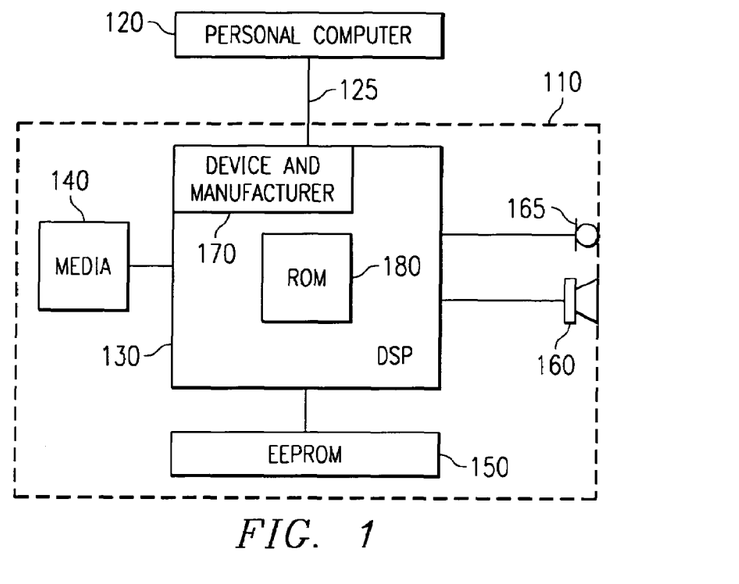
FIG. 1 illustrates a digital device according to a preferred embodiment of the present invention.

Referring now to FIG. 1 for a block diagram illustrating a digital device 110 according to a preferred embodiment of the present invention. The digital device 110 displayed in FIG. 1 is an audio player, built to play encrypted and unencrypted audio files. But as stated previously, the audio player is used solely for illustrative purposes and the present invention should not be construed as being limited to audio players. The digital device 110 is coupled to a personal computer 120 via a connector 125. According to a preferred embodiment of the present invention, the connector 125 between the personal computer 120 and the digital device 110 is a Universal Serial Bus (USB). However, a parallel data connector, a RS-232 serial connector, a Firewire connector, a radio frequency (RF) link, an infrared link, or any other type of connector, wired or wireless, which is capable of carrying data is a permissible substitute for the USB connector.

The personal computer 120 provides the content to the digital device 110 via the connector 125. The content may be music files, books-on-tape files, news, video, art, etc. Some of the content may be protected and some may be unprotected, depending on the content's owner and any agreements between the owner and the user. In an alternate embodiment of the present invention, the personal computer 120 is replaced by a direct network connection to the Internet, a piece of audio equipment, a cellular telephone, a personal digital assistant, or any other type of device that is capable of providing content to the digital device.

Internal to the digital device 110 is a digital signal processor (DSP) 130 which functions as a general-purpose microprocessor controlling the function of the digital device 110. The DSP 130 also decodes the content files for playing purposes. The DSP 130 also performs any encryption and decryption of the data required. The DSP 130 also has some internal memory, including some read-only memory. The read-only memory is for storage of programs and values that do not change. According to a preferred embodiment of the present invention, the read-only memory is a re-programmable read-only memory, permitting modification of programs and values stored in the internal memory. According to a preferred embodiment of the present invention, there are two types of read-only memory, the normal read-only memory that is accessible by programs executing on the DSP 130 and secure read-only memory.

Secure read-only memory, while similar in function to normal read-only memory, permits read access by only authorized programs. The secure read-only memory may be a part of the read-only memory and the DSP 130 simply not permitting unauthorized programs from addressing that particular portion of memory space or the secure read-only memory may be a memory separate from the normal read-only memory. For example, a user program without authorization executing on the DSP 130 would not be able to read the contents of secure read-only memory but would be able to read the contents of the normal read-only memory.

One of the security guidelines set forth by the SDMI requires the ability to bind content files to a single user or digital device. Binding the content files to a single user or digital device prevents the content file from being accessed on a different digital device. One way to do this is to uniquely identify each digital device and to use the unique identifier to bind the content file to the digital device.

In a location inside the read-only memory (ROM) or in a dedicated storage location internal to the DSP 130, are two storage locations. A first stores a manufacturer identifier that is used to identify the manufacturer of the digital device. Every digital device manufactured by the manufacturer will have an identical manufacturer identifier. A second stores a device identifier that is unique for each DSP 130. The device identifier can be used to bind an encrypted file for use to a single digital device since there are no other DSPs with the same device identifier.

The two identifiers are stored ROM where they cannot be modified, however programs executing on the DSP 130 may read the identifiers. This does not present a security issue because only programs authorized to execute on the DSP 130 are allowed to execute. Since they are located inside the DSP 130, attempts to physically modify the identifiers will likely result in destruction of the DSP 130. In another preferred embodiment of the present invention, the two identifiers would be stored in secured ROM where only a subset of the programs executing on the DSP 130 may be able to read the two identifiers.

According to a preferred embodiment of the present invention, the digital device 110 contains a DSP 130. However, the digital device 110 may have a general-purpose microprocessor or a micro-controller in place of (or in addition to) the DSP 130 and the digital device so equipped would function in an equivalent manner.

Also internal to the digital device 110 is some form of storage media 140 for storing the content files, a memory 150 for storing information and programs such as device drivers, encrypted device codes, encryption keys, validation keys, etc., and a speaker 160 and a headphone jack 165.

According to a preferred embodiment of the present invention, the memory 150 is an electrically erasable programmable read-only memory (EEPROM). However, other types of memory that can be reprogrammed and are non-volatile, i.e., the contents of the memory remain when the power is turned-off, are applicable. Examples of suitable memory alternatives include erasable programmable read-only memory (EPROM), Flash memory, non-volatile random access memory (NVRAM), and programmable read-only memory (PROM). The DSP 130 may also have some scratch random access memory (scratch RAM) for temporary storage purposes.

The storage media 140 is a storage location for content files. The storage media 140 may be permanently fixed inside the digital device 110 or it may be removable and attach to the digital device 110 through a slot or connector. According to a preferred embodiment of the present invention, the preferred form of the media 140 is compact flash (CF), however the present invention would be equally operable if multi-media card (MMC), NAND FLASH, Secure Digital (SD) memory card, or Memory Stick forms of media were used. According to another preferred embodiment of the present invention, other forms of storage are viable. They include floppy-disk drives, hard-disk drives, another processor (such as one connected to the digital device via a host port interface (HPI)), and network based storage (such as USB connected mass storage or TCP/IP based storage).

Figure 2:
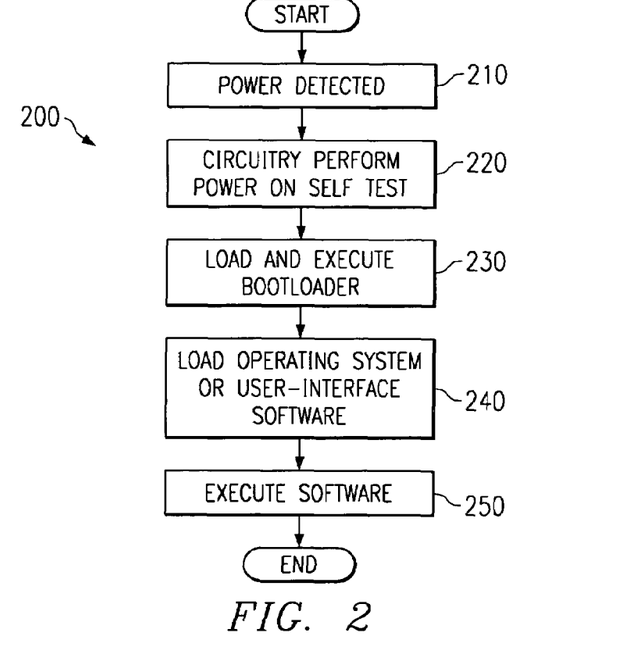
FIG. 2 is a flow diagram displaying a typical sequence of steps occurring during a digital device's power-up process.

Referring now to FIG. 2, a block diagram illustrates a typical power-on sequence 200 for the digital device 110. The power-on sequence 200 begins (block 210) when the user presses the power button (or depending on the digital device, any button on the digital device). Multiple methods to power on the digital device are possible. After power is applied to the digital device 110, it performs what is commonly referred to as a power-on self-test (block 220) where intelligent components within the DSP 130 will perform checks on themselves and other internal components to verify proper operation.

If the components within the digital device 110 pass the power-on self-test, the DSP 130 begins a boot process by executing a bootloader software, which is stored in ROM (block 230). The bootloader software commonly resides in the DSP's read-only memory and transfers code, such as an operating system or a user-interface software, from an external source (EEPROM 150 or external ROM or RAM) to the DSP's program memory (block 240). Because the bootloader resides in the DSP's read-only memory, which normally resides on the same semiconductor chip as the DSP, it is relatively immune from attack since attempts to modify the contents of on-chip memory will typically result in the destruction of the DSP 130. Once the bootloader finishes loading the operating system software or the user-interface software, it completes its operation and turns execution control over to the newly loaded software (block 250).

The power-on sequence 200 is vulnerable to attack because if the hacker can replace the operating system or user-interface software with one of his own construction, he can have the digital device 110 operate in a way that he desires, a manner that is likely to be inconsistent with what the manufacturer intended. Normally, this is relatively easy to do since the operating system or the user-interface software is stored in EEPROM 150 or external ROM or RAM and would only require the hacker to replace the EEPROM 150 or external ROM or RAM with a different component. In order to prevent the digital device 110 from loading and executing the wrong operating system or user-interface software, a secure bootloader can be used.

The normal bootloader will load and execute any software it has been told to execute, without checking to verify the authenticity of the software. The secure bootloader, on the other hand, will only load and execute software that has been encrypted and authenticated. If the software was not encrypted and authenticated, the secure bootloader will not load and execute the software and pass control of the digital device to the software. The secure bootloader prevents unauthorized or modified code from being loaded and executed onto the DSP 130 that could compromise the security of the digital device 110 and its contents. Unauthorized or modified code could permit anyone to download code into the digital device.

Figure 3:
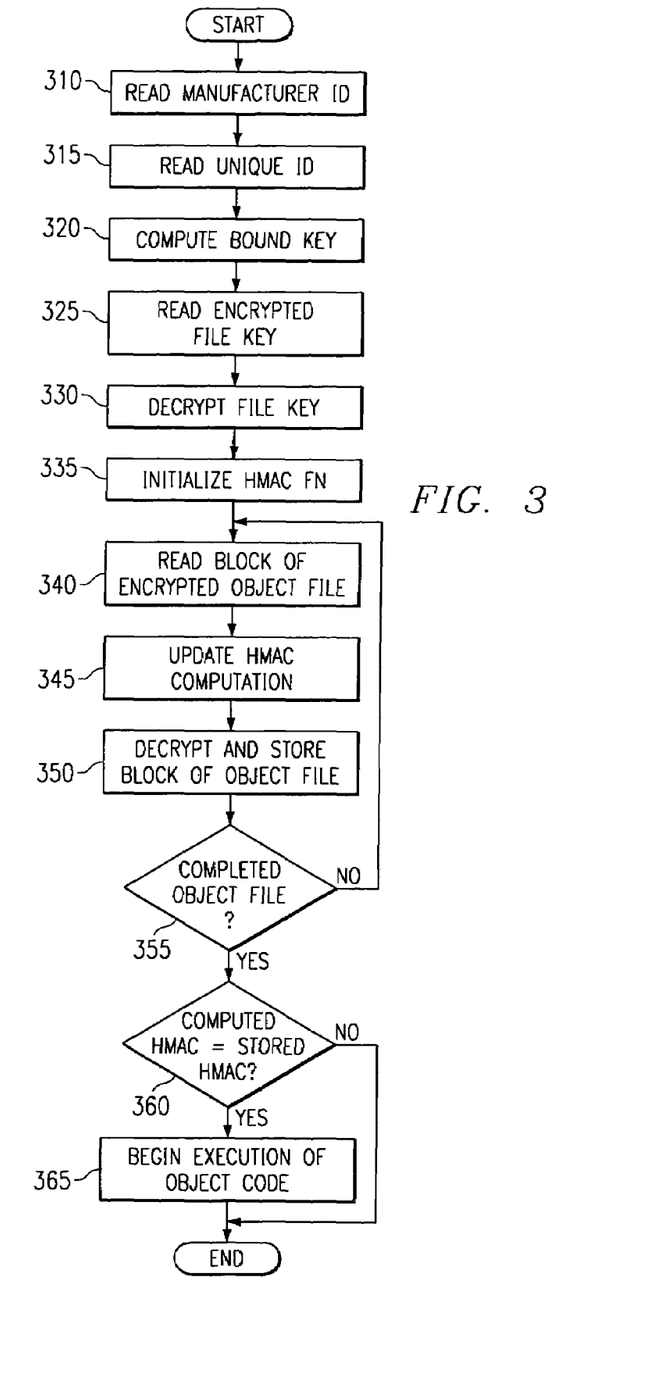
FIG. 3 is a flow diagram displaying the operations performed by a secure bootloader loading an encrypted program file according to a preferred embodiment of the present invention.

FIG. 3 illustrates a flow diagram of an algorithm used by the secure bootloader for loading and executing encrypted software. The secure bootloader begins by reading the manufacturer identifier from the DSP 130 (block 310). The manufacturer identifier is a unique identifier assigned to the manufacturer of the digital device 110 during the manufacturing process of the DSP 130. The secure bootloader also reads the device identifier from the DSP 130 (block 315). There are however, circumstances when a device identifier is not needed or available. One such circumstance is during product development when the software is being developed for the digital device. In that instance, it is not efficient to have the software bound to a single digital device, so the software may be bound only to the manufacturer through the manufacturer identifier.

With the manufacturer identifier and perhaps the device identifier, the bootloader generates a decryption key (block 320). The bootloader uses the manufacturer and device identifiers if they are both available. If both identifiers are used in the decryption key generation, then the key is referred to as a bound key. If only the manufacturer identifier is used, then the key is an unbound key. According to a preferred embodiment of the present invention, a secure hashing function is used to generate the keys. The hashing function used is a commonly known secure hashing function known as SHA-1. SHA-1 takes an arbitrary length input and produces a 160-bit result. The actual keys are 128 bits long and are simply the first 128 contiguous bits of the 160-bit long result of the SHA-1 hashing function. It is to be understood that any arbitrary 128-bit long portion of the 160-bit SHA-1 result would result in an equally secure encryption system, but that it is simpler to chose the first 128 contiguous bits.

The bound key is produced by an operation expressible as:

$$\text{bound\_key} = \text{SHA-1 (manufacturer identifier|device identifier)}]_{128}$$

where the "|" is a concatenation operation and "$]_{128}$" means to use only the first 128 contiguous bits of the result. The unbound key is produced by an operation expressible as:

$$\text{unbound\_key} = \text{SHA-1 (manufacturer identifier)}]_{128}.$$

After generating the key (either a bound key or an unbound key), the secure bootloader reads a file key (block 325). The file key is an encrypted encryption/decryption key that is stored along with its encrypted file. Every encrypted file has associated with it a file key. In this instance, a file key is associated with an encrypted program file containing the operating system or user-interface program that the secure bootloader wishes to load. The secure bootloader must now decrypt the encrypted file key (block 330). According to a preferred embodiment of the present invention, the encryption and decryption algorithm used is the widely known SAFER SK-128 algorithm. The SAFER SK-128 is a symmetric encryption algorithm, meaning that a single key is used for both encryption and decryption. It is to be understood that other symmetric encryption/decryption algorithms, such as DES, AES, Blowfish, or RC5 to list a few.

The decryption of the file key is expressible as:

$$\text{decrypted\_file\_key} = \text{SAFERSK-128(file\_key, key)}$$

where file_key is the encrypted file key and key is either the bound key or the unbound key computed in block 320 and is used as the decryption key to decrypt the encrypted file key.

With the decrypted encryption/decryption key in hand, the secure bootloader begins to authenticate the validity of the encrypted program file. According to a preferred embodiment of the present invention, the secure bootloader uses a function known as a Hashed Message Authentication Code (HMAC) (block 335) which has the formula shown below to authenticate the encrypted program file.

$$\text{HMAC} = \text{SHA-1(decrypted\_file\_key XOR outerpad,}$$
$$\text{SHA-1(decrypted\_file\_key XOR innerpad,}$$
$$\text{data))}$$

where XOR is the bit-wise exclusive-or function, the outerpad is a sequence of the hexadecimal value 0×5c repeated 64 times and the innerpad is a sequence of the hexadecimal value 0×36 repeated 64 times.

According to a preferred embodiment of the present invention, the encrypted file is read a block at a time (block 340), the HMAC value is updated using the newly read block (block 345), and the block is decrypted and stored (block 350). This is repeated (No at block 355) until the entire encrypted file has been read and decrypted (Yes at block 355). According to a preferred embodiment of the present invention, the encrypted file block, after being decrypted is loaded into memory. Alternatively, the decrypted file block may be stored in another portion of memory, not program memory. It should be easily understood that in another preferred embodiment of the present invention the entire encrypted file is read and decrypted in a single operation.

After the entire file has been decrypted and stored the secure bootloader reads the HMAC value that was stored with the encrypted file. The secure bootloader compares the read HMAC value with the HMAC value it has calculated (block 360). If the two HMAC values are the same (Yes at block 360), then the encrypted file has been authenticated and the bootloader can execute the program (block 365). If the HMAC values do not match (No at block 360), then the bootloader will cease execution. According to another preferred embodiment of the present invention, the bootloader would generate an error message prior to ceasing execution.

Since the stored HMAC value and the calculated HMAC values are generated using the decrypted file key, which was decrypted using either the manufacturer identifier or both the manufacturer and device identifiers, the hacker in all probability would not be able to generate a different HMAC value for his replacement program what would result in the comparison of the two HMAC values being equal. Therefore, if the two HMAC values match, then the encrypted program file must be the program file that is intended for the digital device.

Figure 4:
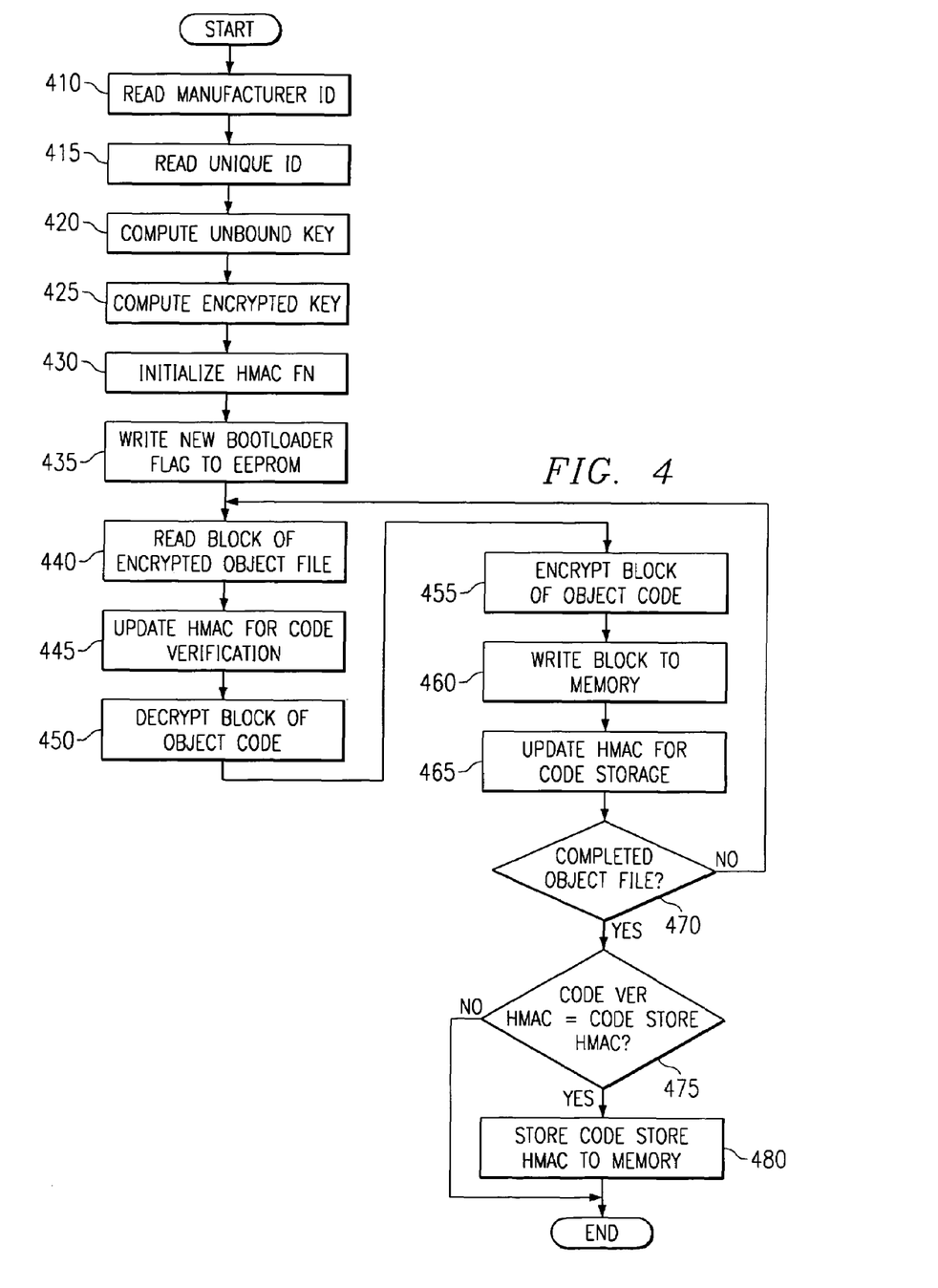
FIG. 4 is a flow diagram displaying the operations performed by a secure bootloader operating in re-authoring mode according to a preferred embodiment of the present invention.

During the manufacturing process for the digital device 110, it would be highly inefficient to encrypt the program file using each individual digital device's device identifier and store it into the digital device's memory 150. The inefficiency is due mainly in the difficulty of obtaining the device identifier and then encrypting the program file. Doing so would require a computer at each assembly station and would unnecessarily slow down the production line. Rather that reducing the overall production rate, a single generic encrypted program file is generated using the manufacturer identifier and stored in each digital device 110. The generic encrypted program file is encrypted using the manufacturer identifier and the same program file will execute on all digital devices made by that manufacturer. Then during the initial power-up, the secure bootloader will decrypt the encrypted program file and re-encrypt it using both the device identifier and the manufacturer identifier, locking the program file to the individual digital device. This process is referred to as re-authoring mode. The initial power-up can occur during functional test and quality control stages of the manufacturing process and would not add any additional time to the manufacturing process. Referring now to FIG. 4 for a flow diagram displaying an algorithm used by the secure bootloader for locking the program file to the individual digital device, also known as re-authoring mode. The secure bootloader used for re-authoring can be the same secure bootloader used for loading the encrypted program file during normal power-up sequences or it may be a special one-time use secure bootloader. According to a preferred embodiment of the present invention, the secure bootloader used for re-authoring is the same secure bootloader uses during normal power-up sequences. A bootloader mode flag is used to let the secure bootloader know which mode it should be operating in.

The secure bootloader reads the manufacturer identifier from the storage location (block 410), then reads the device unique identifier (block 415) and uses the manufacturer identifier to generate an unbound key (block 420). The unbound key is used to decrypt the encrypted program file, which was encrypted using an encryption key that used the manufacturer identifier. The unbound key is created using the operation:

$$\text{unbound\_key} = \text{SHA-1}(\text{manufacturer identifier})]_{128}$$

where "$]_{128}$" means to use only the first 128 contiguous bits of the result.

The bootloader then creates the encryption key (block 425), which uses both the device identifier and the manufacturer identifier and is expressible as:

$$\text{encryption\_key} = \text{SHA-1}(\text{manufacturer identifier}|\text{device identifier})]_{128}$$

where the "|" is a concatenation operation and "$]_{128}$" means to use only the first 128 contiguous bits of the result.

After obtaining the encryption key, the secure bootloader changes the bootloader mode flag to normal secure bootloader operating mode (block 435) and writes it to memory and then begins to authenticate the encrypted program file. As in the case where the secure bootloader is used to load the program file, the secure bootloader in re-authoring mode uses the Hashed Message Authentication Code (HMAC) function for authentication purposes. However, in re-author mode, the bootloader maintains two different HMAC values. One HMAC value is used for code verification, i.e., it is used to verify the authenticity of the program file being decrypted. The second HMAC value is used to generate an authentication value for the newly re-encrypted program file being created. The second HMAC value is for use by the secure bootloader to authenticate the re-encrypted program file each subsequent time the digital device 110 is powered up.

According to a preferred embodiment of the present invention, the encrypted file is read a block at a time (block 440), the first HMAC value is updated using the newly read block (block 445), the block is decrypted using the unbound key (block 450), the block is re-encrypted using the encryption key and stored to memory (blocks 455 and 460), and the second HMAC value is updated using the re-encrypted block (block 465). This is repeated (No at block 465) until the entire encrypted file has been read and decrypted (Yes at block 465). It should be easily understood that in another preferred embodiment of the present invention the entire encrypted file is read and decrypted in a single operation.

After the entire file has been reencrypted and stored, the secure bootloader reads the HMAC value that was stored with the encrypted file. The secure bootloader compares the read HMAC value with the first HMAC value it has calculated (block 475). If the two HMAC values are the same, then the re-encrypted file has been authenticated and the second HMAC value is stored to memory and the bootloader has completed. If the HMAC values do not match, then the bootloader will cease execution and produce an error message.

A software-based security system is not sufficient to provide total security when the attacker has physical access to the digital device. Hardware support must be present to supplement the software-based security system. As discussed earlier, the DSP 130 according to a preferred embodiment of the present invention has a portion of its internal memory that is accessible only to authorized programs. This part of internal memory is known as secured read-only memory. Only authorized programs will be able to address memory locations within the secured read-only memory.

An additional hardware-based security feature would be to reduce the amount of memory addressable by programs loaded through a host port interface (HPI). The HPI is an interface between the DSP 130 and an optional micro-controller that is used to control functionality of the digital device. Without the micro-controller, the DSP 130 can be used to control functionality of the digital device. Since the micro-controller is controlling how the digital device is operating, it becomes a possible path of attack for a hacker attempting to break through the software-based security features. One way to reduce the security hole presented by the micro-controller is to reduce the amount of memory space addressable by programs loaded into the DSP 130 through the HPI. The programs can be limited to only accessing and using a small fraction of the available memory space. This partitioning of the memory space can be used to separate sensitive programs and data values from unauthorized programs.

Finally, most DSPs and microprocessors include extra hardware to facilitate functional test and emulation. A commonly used technical standard for hardware providing functional test and emulation is the IEEE technical standard 1149.1-1990, also known as the JTAG standard. This additional hardware permits the user to stop the execution of programs running on the DSP and examine the contents of memories and registers. The user can even change the value of memory locations and registers. To close this major security hole, the DSP manufacturer is should either not include JTAG hardware or to disable the JTAG hardware once functional testing and emulation is complete.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for ensuring security during the power-on process of a digital device and its contents comprising the steps of:

disposing a read only memory storing a bootloader program for control of the programmable data processor, a first read only memory location storing a manufacturer identifier and a second read only memory location storing a device identifier unique to that digital device on a same semiconductor chip as a programmable data processor, the first read only memory location and the second read only memory location not accessible external to the semiconductor chip and not modifiable;

upon each power-up of the digital device controlling the programmable data processor via the bootloader program to:
  A. read the manufacturer identifier from the first read only memory location;
  B. read the device identifier from the second read only memory location;
  C. compute a first encryption/decryption key using the manufacturer identifier and the device identifier;
  D. read an encrypted second encryption/decryption key from a memory;
  E. decrypt the second encryption/decryption key using the first encryption/decryption key;
  F. read an encrypted program file from a memory;
  G. compute a hashing value for said encrypted program file;
  H. decrypt said encrypted program file using the decrypted second encryption/decryption key;
  I. store said decrypted program file in a memory;
  J. read a hashing value associated with the program file from a memory;
  K. compare said computed hashing value with said read hashing value;
  L. execute said decrypted program file via the programmable data processor if said comparison was equal; and
  M. assert an error message if said comparison was not equal.

2. A method for ensuring a secure code re-authoring session during the boot process in a digital device comprising the steps of:
  A. disposing a read only memory storing a bootloader program for control of the programmable data processor, a first read only memory location storing a manufacturer identifier and a second read only memory location storing a device identifier unique to that digital device on a same semiconductor chip as a programmable data processor, the first read only memory location and the second read only memory location not accessible external to the semiconductor chip and not modifiable;
  B. controlling the data processor via the bootloader program to read the manufacturer identifier from the first read only memory location;
  C. controlling the data processor via the bootloader program to read the device identifier from the second read only memory location;
  D. controlling the data processor via the bootloader program to compute a first encryption/decryption key from the manufacturer identifier;
  E. controlling the data processor via the bootloader program to compute a second encryption/decryption key from the manufacturer identifier and the device identifier;
  F. controlling the data processor via the bootloader program to read an encrypted program file;
  G. controlling the data processor via the bootloader program to compute a first hashing value with said read encrypted program file;
  H. controlling the data processor via the bootloader program to decrypt said read encrypted program file using the first encryption/decryption key;
  I. controlling the data processor via the bootloader program to re-encrypt said decrypted program file using the second encryption/decryption key;
  J. controlling the data processor via the bootloader program to store said re-encrypted program file in a memory;
  K. controlling the data processor via the bootloader program to compute a second hashing value with said re-encrypted program file;
  L. controlling the data processor via the bootloader program to read a third hashing value associated with the program file from a memory;
  M. controlling the data processor via the bootloader program to compare said first hashing value with the third hashing value;
  N. controlling the data processor via the bootloader program to store second hashing value if said comparison was equal; and
  O. controlling the data processor via the bootloader program to assert an error message if said comparison was not equal.

3. A digital device comprising:
  a programmable data processor;
  a first read only memory location disposed on a same semiconductor chip as said programmable data processor storing a manufacturer identifier not accessible external to said semiconductor chip and not modifiable;
  a second read only memory location disposed on said same semiconductor chip as said programmable data processor storing a device identifier unique to that digital device not accessible external to said semiconductor chip and not modifiable;
  a read only memory disposed on said same semiconductor chip as said programmable data processor storing a bootloader program for control of the programmable data processor, said bootloader program operable to control the data processor upon each power-up of the digital device to:
    A. read the manufacturer identifier from the first read only memory location;
    B. read the device identifier from the second read only memory location;
    C. compute a first encryption/decryption key using the manufacturer identifier and the device identifier;
    D. read an encrypted second encryption/decryption key from a memory;
    E. decrypt the second encryption/decryption key using the first encryption/decryption key;
    F. read an encrypted program file from a memory;
    G. compute a hashing value for said encrypted program file;
    H. decrypt said encrypted program file using the decrypted second encryption/decryption key;
    I. store said decrypted program file in a memory;
    J. read a hashing value associated with the program file from a memory;
    K. compare said computed hashing value with said read hashing value;
    L. execute said decrypted program file via the programmable data processor if said comparison was equal; and
    M. assert an error message if said comparison was not equal.

4. The digital device of claim 3, wherein: said read only memory consists of:
  normal read only memory accessible by any program executing on the data processor, and
  secure read only memory not accessible external to said semiconductor chip, said bootloader program stored in said secure read only memory.

5. A digital device comprising:
a programmable data processor;
a first read only memory location disposed on a same semiconductor chip as said programmable data processor storing a manufacturer identifier not accessible external to said semiconductor chip and not modifiable;
a second read only memory location disposed on said same semiconductor chip as said programmable data processor storing a device identifier unique to that digital device not accessible external to said semiconductor chip and not modifiable;
a read only memory disposed on said same semiconductor chip as said programmable data processor storing a bootloader program for control of the programmable data processor, said bootloader program operable to control the data processor upon each power-up of the digital device to:
 A. read the manufacturer identifier from the first read only memory location;
 B. read the device identifier from the second read only memory location;
 C. compute a first encryption/decryption key from the manufacturer identifier;
 D. compute a second encryption/decryption key from the manufacturer identifier and the device identifier;
 E. read an encrypted program file;
 F. compute a first hashing value with said read encrypted program file;
 G. decrypt said read encrypted program file using the first encryption/decryption key;
 H. re-encrypt said decrypted program file using the second encryption/decryption key;
 I. store said re-encrypted program file in a memory;
 J. compute a second hashing value with said re-encrypted program file;
 K. read a third hashing value associated with the program file from a memory;
 L. compare said first hashing value with the third hashing value;
 M. store second hashing value if said comparison was equal; and
 N. assert an error message if said comparison was not equal.

* * * * *